Dec. 9, 1924.

A. E. GLANCY 1,518,405

OPHTHALMIC LENS

Filed May 19, 1923

INVENTOR
ANNA E. GLANCY
BY
Harry H. Styll.
ATTORNEY

Patented Dec. 9, 1924.

1,518,405

UNITED STATES PATENT OFFICE.

ANNA ESTELLE GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed May 19, 1923. Serial No. 640,094.

*To all whom it may concern:*

Be it known that I, ANNA ESTELLE GLANCY, a citizen of the United States, residing at Southbridge, in the county of Worcester and State of Massachusetts, have invented certain new and useful Improvements in Ophthalmic Lenses, of which the following is specification.

This invention relates to improvements in ophthalmic lenses and has particular reference to lenses of the multifocal type.

A great many people require correction for both near and long distance vision. Bifocal lenses have been developed for such correction but they have not been very satisfactory because while objects in two planes are in focus, all the intermediate distances are not clearly visible. This condition is especially annoying in going up or down stairs, or in alighting from vehicles; so it will be readily apparent that the bifocal lens is not a perfect corrective. Trifocal lenses were made to overcome this defect in bifocals, and while with lenses of this type one intermediate distance is brought into focus objects at the remaining intermediate distances are indistinct. Another objection to bifocals and trifocals lies in the fact that there is a line of division between the different fields. In moving the eye from one field to another there is a sudden jump in passing the dividing line due to the difference in power, and this causes a strain on the optic muscles.

In the past, some lenses with a multiplicity of foci have been devised, but some of them have been impractical of manufacture, and others have been undesirable because of surface astigmatism and spherical aberrations.

One object of the present invention is to produce an ophthalmic lens having a multiplicity of foci for reading, long distance, and intermediate vision.

Another object is to provide such a multifocal lens constructed of a single piece of glass.

Another object is to provide a multifocal lens having a power for long distance vision, a power for reading, and a multiplicity of powers for all intermediate distances, all of said powers blending gradually from reading to long distance power.

Another object is to provide a multifocal lens without any segment boundaries.

Another object is to provide such a multifocal lens which shall be free from surface astigmatism at all points.

Other objects and advantages will be apparent during the course of the following description, taken in connection with the accompanying drawings, wherein one form of the invention is shown. It is, of course, to be understood that the drawings are merely illustrative and that I do not limit myself to what is herein shown and described, but that I reserve the right to make changes falling within the scope of the claims without departing from the spirit of the invention.

In the drawings.

Similar reference characters designate corresponding parts throughout the several views.

Figure 1:
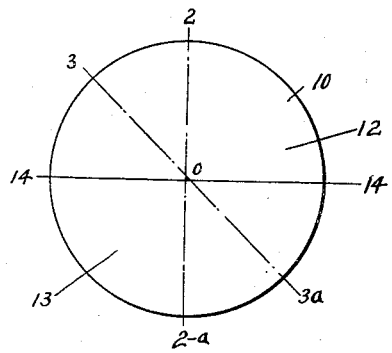
Figure 1 is an elevation of a lens made in accordance with my invention.
Figure 2:
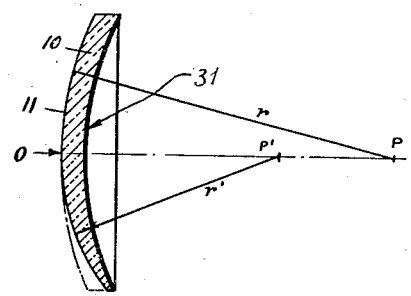
Figure 2 is a transverse sectional view on the line 2—2ª of Figure 1.
Figure 3:
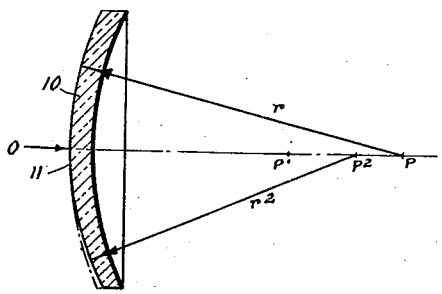
Figure 3 is a similar view on the line 3—3ª of Figure 1.

My improved lens 10 is provided on one of its sides 11 with a spherical surface 12 on its upper portion for distance vision correction, and a symmetrical multiple osculating spherical surface 13 on its lower portion for near and intermediate vision correction. The latter surface is generated by the rotation of a circle about a diameter (the Z axis) simultaneously with a continuous change in the radius of this circle, the center of the circle moving along the Z axis, and the intersection of the Z axis with the surface remaining fixed and forming the vertex of the surface. This may be more readily understood by reference to Figures 1, 2 and 3, wherein the spherical surface 12 has a radius $r$ struck from the point P on the axis OP. Thus the power will be the same at all points in the surface 14—2—14—0. The lines 14—0 and 0—14 may be in alignment as shown, or they may be disposed at an angle to one another. The near vision correction, or reading power, lies in the vertical meridian 0—$2^a$, and has a radius $r'$ struck from the point P' on the axis. From this it will be evident that the power will be the same at all points in the line 0—$2^a$, and that the near vision curve will be tangent with the distant vision curve at the point 0. In Figure 3 it will be seen that the section of the surface at line 3—0 is the same as at 2—0, whereas the section at 0—$3^a$ has a radius $r^2$ struck from point $P^2$ situated between P—P'. The power will be the same on all points in the line 0—$3^a$ and will be a correction for an intermediate distance. Each meridian or radial line between 0—$2^a$ and 0—14 will have a different power, varying continuously from reading to distance. These varying curvatures all blend into one another and are all tangent to the distance curve at the point 0.

Figure 4:
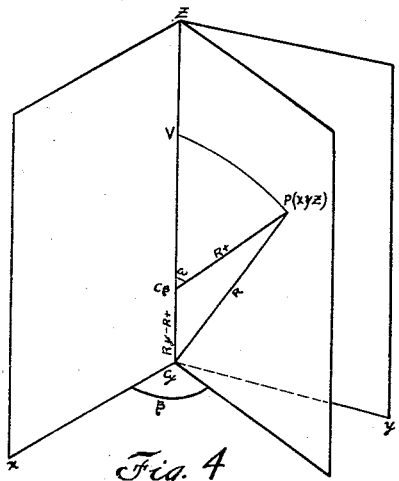
Figure 4 is a mathematical diagram of the multifocal surface.

The multifocal surface 13 may be described mathematically as follows, reference being made to Figure 4:

Let $Rx$ and $Ry$ be two given radii, and let $Cy$ be center of curvature for a sphere of radius $Ry$. Let a radius of this sphere be taken as the Z axis and draw the XZ and yZ planes at right angles to each other to form a right-handed system of rectangular coordinates. Thru the point $Z=Ry$ suppose a symmetrical multiple osculating sphere to be described as follows: Let the plane YZ intersect this surface in a circle of radius $Ry$. Let the XZ plane intersect the surface in circle of radius $Rx$. Let any plane through Z axis, making $<\beta$ with XZ plane intersect the surface also in a circle of radius $Rt$, intermediate in numerical value between $Rx$ and $Ry$ (or equal), with the condition imposed that $Rt$ varies from $Rx$ to $Ry$ continuously (i. e. without points of discontinuity). Let $w$ be angle which the radius sector for any point $(x, y, z)$ of the surface makes with $z$ axis; then equation of surface is given by $$x^2+y^2+z^2 = (Ry-Rt)^2+Rt^2+2Rt(Ry-Rt)\cos w$$

where $Rt=$ any continuous function ($Rx$, $Ry \pm \beta$) with limiting magnitudes $Rx$ and $Ry$, and symmetrical with respect to $xz$ and $yz$ planes.

The curvatures of the lens illustrated have been exaggerated for the purpose of clearness; the radii of the curves will, of course, depend upon the amount of correction necessary. Also it will be evident that the surface described may be on either the convex or the concave side of the lens. Furthermore, the axis OP need not be in the geometrical center of the lens, but may be disposed either above or below it if desired.

Figure 5:
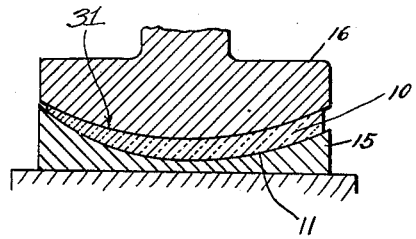
Figure 5 is a sectional view illustrating one step in the manufacture of my improved lens.

The drawings illustrate one method of manufacturing the lens, but I do not limit myself to any particular structure or apparatus for this purpose. The lens blank is first heated to a point where it is softened without running, and while in this heated condition it is put on a die or former 15 and pressed by a second former 16, as shown in Figure 5. The die 15 is provided with a generated surface to form the multifocal side 11 of the lens, and the member 16 is provided with the approximate curvature of the other side of the lens. Thus the lens is formed with the proper optical surfaces ready for finishing. The lens is then secured in any suitable manner to a block 17, to grind the surface 11.

Figure 6:
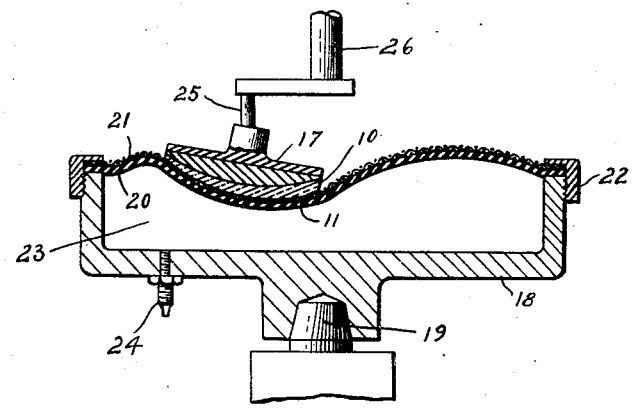
Figure 6 is a view partly in section, illustrating one method of grinding the multifocal surface.

In Figure 6 is illustrated one form of grinding tool, composed of a cup member 18 mounted upon the usual rotatable spindle 19, and provided on its upper side with flexible diaphragm 20, such as sheet rubber, covered by a sheet of fine metal cloth 21. The diaphragm and cover are held in place by a clamping ring 22, thus providing a chamber 23 into which compressed air may be introduced through the valve 24. The blocked lens 10 is then applied, as shown, with the surface 11 contacting with the metal cloth 21, and rotated thereon by the crank pin 25 of the spindle 26, a suitable abradant, such as ground emery, being used on the cloth 21. Thus the surface may be ground uniformly without departing from the multifocal curve molded upon it by the die 15. The multifocal surface 11 may be polished in a similar way by substituting a piece of soft felt for the wire cloth 21, and rotating the lens thereon with moistened rouge or other polishing medium.

After the surface 11 is finished, the opposite side 31 is ground and polished in the usual manner to a curvature which will combine with that of the surface 11 to give the proper optical correction. This curve 31 may be either spherical or cylindrical and is usually applied by the prescriptionist fitting the glasses.

From the foregoing it will be seen that I have produced a new and improved ophthalmic lens embodying long distance and near vision corrections, and corrections for all intermediate distances. The various powers blend gradually and there is no line of division between the different fields. Furthermore, the lens is free from surface astigmatism at all points, and can be readily manufactured commercially.

Having thus described my invention, what I claim is:

1. A multifocal lens having a long distance vision correction on its upper portion, a near vision correction on the vertical meridian of the lower portion, and intermediate vision corrections on the diverging meridians between the long distance and near vision corrections, the power being the same at all points in a meridian, and the power in the successive meridians varying from near vision to long distance vision in accordance with any mathematical law of variations.

2. An ophthalmic lens having a multiplicity of foci, the curvatures of said foci being arranged on meridional lines diverging from a common point of tangency, said curvatures varying gradually from long distance to near vision correction, the power perpendicular to each meridian at any point being equal to the power along the meridian.

3. An ophthalmic lens having a spherical curve on a portion of one of its surfaces, a symmetrical multiple osculating spherical curve on the remainder of said surface, and a suitable curve on the opposite side to combine optically therewith.

4. An ophthalmic lens having a spherical curve on a portion of one of its surfaces, a symmetrical multiple osculating spherical curve tangent therewith, and a suitable surface on the opposite side to combine optically therewith.

5. A multifocal lens having an upper distance portion and a near vision correction on the vertical meridian of the lower portion and intermediate vision corrections on meridians diverging from the point of tangency of the upper and lower vertical meridians, and the power in each meridian equals the power at right angles to that meridian.

6. A multifocal ophthalmic lens surface with constant power along any one radial surface line diverging from a vertex and having the tangential surface powers at any point equivalent to the radial surface power at that point.

A. ESTELLE GLANCY.